United States Patent
Allen et al.

(10) Patent No.: US 6,848,571 B2
(45) Date of Patent: Feb. 1, 2005

(54) METHOD FOR SPLICING A CONVEYOR BELT

(75) Inventors: Terry Frank Allen, Barberton, OH (US); Kevin Xie, Marysville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/756,554

(22) Filed: Jan. 13, 2004

(65) Prior Publication Data

US 2004/0154903 A1 Aug. 12, 2004

Related U.S. Application Data

(62) Division of application No. 10/225,950, filed on Aug. 22, 2002, now Pat. No. 6,749,708.

(51) Int. Cl.[7] .............................. B29D 17/00; F16G 3/10
(52) U.S. Cl. ..................... 198/844.2; 156/137; 156/502; 474/254
(58) Field of Search .......................... 198/844.2; 24/38; 156/137, 502; 474/254

(56) References Cited

U.S. PATENT DOCUMENTS

| | | | |
|---|---|---|---|
| 3,487,871 A | | 1/1970 | Kanamori .................... 156/266 |
| 4,041,806 A | * | 8/1977 | Klar ............................. 73/159 |
| 4,153,772 A | | 5/1979 | Schwesig et al. ........... 526/308 |
| 4,215,021 A | * | 7/1980 | Ogawa et al. ............... 524/526 |
| 4,255,296 A | * | 3/1981 | Ogawa et al. ............... 524/255 |
| 4,548,663 A | | 10/1985 | Worcester .................... 156/159 |
| 4,674,622 A | * | 6/1987 | Utsunomiya et al. ....... 198/500 |
| 4,681,646 A | | 7/1987 | Pinto et al. .................. 156/157 |
| 4,898,223 A | | 2/1990 | Botzman et al. ............ 152/547 |
| 5,115,001 A | * | 5/1992 | Beckmann .................... 524/58 |
| 5,340,867 A | | 8/1994 | Yagawa et al. ............... 524/80 |
| 5,377,818 A | | 1/1995 | White ...................... 198/844.2 |
| 5,552,460 A | | 9/1996 | Schmidt et al. ............. 523/522 |
| 5,562,796 A | | 10/1996 | Ertel ............................ 156/498 |
| 5,609,242 A | | 3/1997 | Hutchins et al. ............ 198/847 |
| 5,824,383 A | * | 10/1998 | Tuttle et al. ................... 428/60 |
| 6,086,806 A | | 7/2000 | Weatherall et al. .......... 264/152 |
| 6,180,703 B1 | | 1/2001 | Onoi et al. .................. 524/265 |
| 6,187,855 B1 | * | 2/2001 | Nagai et al. ................. 524/526 |
| 6,372,071 B1 | | 4/2002 | Garro et al. ................. 156/124 |
| 6,554,934 B1 | | 4/2003 | Steven et al. ................ 156/137 |

FOREIGN PATENT DOCUMENTS

WO     WO 00/53952     9/2000

* cited by examiner

Primary Examiner—Douglas Hess
(74) Attorney, Agent, or Firm—John D. DeLong (57) ABSTRACT

A method is provided for splicing a conveyor belt having vulcanized rubber with steel strands embedded in the vulcanized rubber, comprising the steps of exposing a plurality of strands at two belt ends, and applying a vulcanizable rubber composition to the exposed strands to form a spliced joint between the two belt ends, the vulcanizable rubber composition comprising 100 parts by weight of rubber, and the rubber comprising from about 1 to about 40 parts by weight of a polyoctenamer.

11 Claims, 7 Drawing Sheets

FIG-10 ated (13), it is believed that the term
METHOD FOR SPLICING A CONVEYOR BELT

This is a Divisional of Application Ser. No. 10/225,950, filed on Aug. 22, 2002, now U.S. Pat. No. 6,749,708.

FIELD OF THE INVENTION

The invention is directed to a method for splicing a conveyor belt having vulcanized rubber with steel strands embedded in the vulcanized rubber, comprising the steps of exposing a plurality of strands at two belt ends, and applying a vulcanizable rubber composition to the exposed strands to form a spliced joint between the two belt ends, the vulcanizable rubber composition comprising 100 parts by weight of rubber, and the rubber comprising from about 1 to about 40 parts by weight of polyoctenamer.

BACKGROUND OF THE INVENTION

Conveyor belts are commonly used as a means to move material from one location to another. In large mining operations, the conveyor belt is generally formed of a rubber body embedded with steel cords or strands. A cover compound can be used at the surface wherein the material is to be conveyed. Generally the compound is very abrasion and cut resistant and of sufficient thickness to prevent the rocks being conveyed from tearing the belt. A pulley compound can be used on the interior surface, this rubber is ideally suited for improved wear as the belt traverses over the pulleys used to drive the belt.

These steel corded or stranded belts may extend several miles and cost millions of dollars to install and fabricate. The fabrication of such belts occurs initially at a factory wherein steel strands or cords are arranged in a coplanar relationship parallel to the surface of the belt so that the belt will exhibit uniform expansion and minimize weaving as it traverses which can cause belt damage.

The prior art method of fabricating belts requires the steps of vulcanizing the rubber belt and winding it onto large spools for shipping to the site. Once the spools of belt are received at the site, the ends must be prepared for splicing by removing the vulcanized rubber from the strands over a distance determined to be sufficient to provide enough joint length to make a secure splice.

Removal of the rubber can be a very time consuming and tedious task. Often times piano wire is used to peel the vulcanized rubber from the strands. In large belts of several feet in width over a hundred strands must be exposed at each joint end. Once exposed, the strands had to be cleaned of as much of the vulcanized rubber as possible. The strands were then cleaned with solvents such as toluene and then a bonding agent was applied comprising a 3:2 mixed solution of "Chemlok No. 203" and xylene, for example, and rubber cement is applied to the strands and dried. After the preparation of both ends as described in U.S. Pat. No. 3,487,871 entitled "A METHOD OF JOINING CONVEYOR BELTS HAVING STEEL CORDS EMBEDDED THEREIN" granted Jan. 6, 1970, a joining member is formed made of vulcanized or semi-vulcanized rubber of the same quality as the rubber used in the formation of the belt. The upper face of the member is preferably made of a non-vulcanized rubber and provided with a plurality of strand receiving grooves. Once the strands are in place, a bonding agent of the type described above is preferably coated on the faces of the surfaces to insure complete bonding. While this prior art patent use the term "non-vulcanized rubber" being preferable at the melting surfaces of the otherwise vulcanized or semi-vulcanized member (13), it is believed that the term means "having at least its upper surface formed of incompletely vulcanized rubber" as was required in the claim of the patent. An important limitation when the member for splicing is semi-vulcanized at this grooved surface, the use of semi-cured rubber forced the use of bonding solvents. These solvents are high in VOC's and the liberal use of xylene and toluene creates carcinogenic risks to the personnel. In developed parts of the world, the use of such solvents is greatly discouraged.

A second limitation of the prior art splicing member is that the member was apparently molded to the exact width of the belt and had exactly twice the number of strands as the belt. This meant that for each belt width, there had to be a unique member since conveyor belts are not standardized in width or in the size or in the number of strands to use the concept taught in that patent required specially designed molds.

A third limitation of the method of splicing described in U.S. Pat. No. 3,487,871 was that the strands had to be free of any of the vulcanized belt rubber which, if left on the strands, adversely affected the bonding.

An alternative method to solvent stripping method for splicing a conveyor belt is taught in PCT publication WO 00/53952, wherein a method of splicing the ends of conveyor belts having vulcanized rubber with steel strands embedded in the vulcanized rubber is disclosed. The method has the steps of (A) removing a portion of the rubber from the belt ends to be joined exposing a plurality of strands;

(B) providing preformed unvulcanized strips of rubber, in an array of bottom strips each strip having a concave quarter-circular profile wherein strips when laid adjacently to each other form strand receiving grooves located on an upper surface, (C) placing exposed strands of the belt ends being joined in the grooves of the bottom strip; and (D) placing top strips overlying the array of bottom strips and vulcanizing the strips together thereby forming the spliced joint.

High modulus compounds have been proven to be necessary to increase the splice load capability of steel cable-reinforced conveyor belts. Steel cable-reinforced conveyor belts are graded relative to splice strength in a dynamic mode. Splice strength has historically been rated at 30 percent of cable breaking strength. Higher modulus compounds enable the splice rating to be increased into the 40 to 50 percent range.

Steel cable-reinforced conveyor belts are rated according to splice strength. This rating is determined by dynamically testing a belt under tension at a percentage of the total belt breaking strength. Customers now refer to this rating for purchasing decisions. It is desirable to develop novel splice methods utilizing rubber compounds that will allow the dynamic testing, commonly referred to as the Hanover test, to reach a higher number of cycles at a specific test load or a belt to be successfully tested at a higher load.

SUMMARY OF THE INVENTION

The invention is directed to a method for splicing a conveyor belt having vulcanized rubber with steel strands embedded in the vulcanized rubber, comprising the steps of exposing a plurality of strands at two belt ends, and applying a vulcanizable rubber composition to the exposed strands to form a spliced joint between the two belt ends, the vulcanizable rubber composition comprising 100 parts by weight of rubber, and the rubber comprising from about 1 to about 40 parts by weight of polyoctenamer.

DETAILED DESCRIPTION OF THE INVENTION

The invention is directed to a method for splicing a conveyor belt having vulcanized rubber with steel strands embedded in the vulcanized rubber, comprising the steps of exposing a plurality of strands at two belt ends, and applying a vulcanizable rubber composition to the exposed strands to form a spliced joint between the two belt ends, the vulcanizable rubber composition comprising 100 parts by weight of rubber, and the rubber comprising from about 5 to about 40 parts by weight of polyoctenamer.

Figure 1:
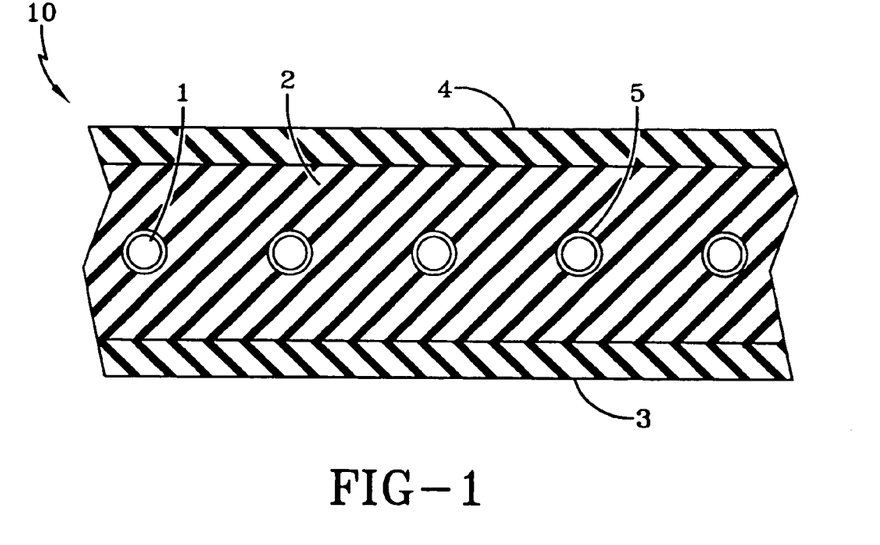
FIG. 1 is a fragmentary cross-sectional view of an exemplary belt structure having steel strands embedded in vulcanized rubber.

With reference to FIG. 1, an exemplary conveyor belt (10) will be observed. The belt (10) has a plurality of steel cords or strands (1) embedded in a core or central layer of rubber (2). As illustrated, the central layer (2) is bounded by a bottom layer of rubber (3) of a compound ideally suited for contacting the drive pulleys of the conveyor system (not shown) and a cover layer (4) of a rubber compound ideally suited for abrasion and cut resistance. Additionally, such belts (10) may include additional textile or fabric layers or alternatively are formed utilizing only a single homogeneous rubber without a top or bottom compound while the steel strands of the belt may be impregnated or coated with a thin rubber bonding layer or sheath (5) to enhance cord adhesion. Nevertheless, the present invention is ideally suite to facilitate the splicing of almost any known type of rubber conveyor belts (10) having steel cords or strands (1).

Figure 2:
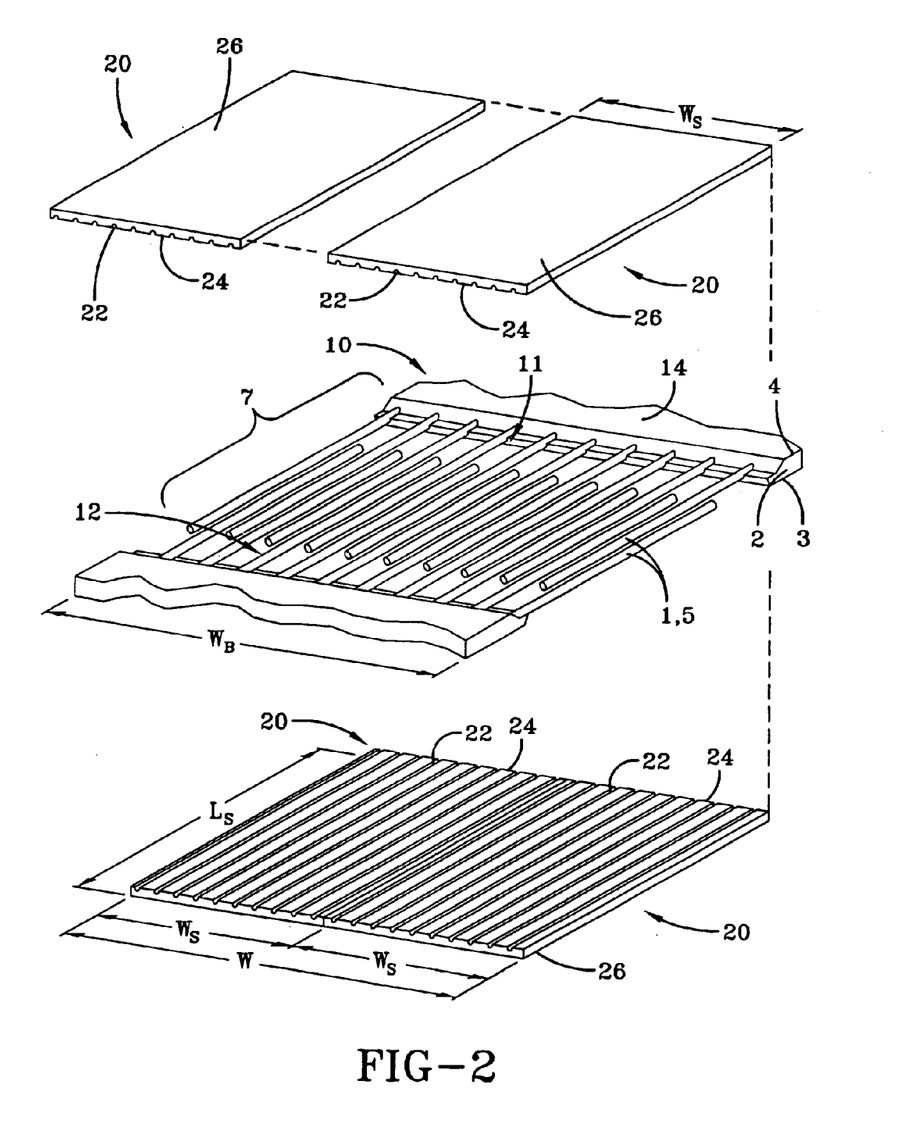
FIG. 2 is a perspective view of a belt end prepared for attachment to a corresponding belt end and a plurality of the preformed unvulcanized strips (20) of rubber for joint splicing.

As shown, preparation of the belt ends (11, 12) to be joined is illustrated in FIG. 2. The belt ends (11, 12) has a portion of the body (14) of the belt (10) removed to expose the steel strands (1). For convenience, the term "body (14) of the belt (10)" is intended to include all body elements such as the central layer (2), the bottom (3), the cover (4), and any other layers. That portion of the body (14) is removed preferably across the width of the belt in a diagonally extending direction. This insures that the splice seam will not approach a drive pulley simultaneously. Additionally the layer of rubber on the top surface of the strands may be cut back further than the lower layer of rubber below the strands, this method of ends (11, 12) preparation is commonly referred to as a stepped contour. These features, although not required, can improve the splice joint in some applications.

Once the rubber body (14) is removed from an end (11, 12), the strands (1) of steel cord are exposed. In some techniques of removing the rubber body (14) steel piano wire is used to peel the rubber off the cords (1). In that method of body removal (14), virtually all of the rubber sheathing the steel cord is removed such that the cords are only at least partially sheathed in cured rubber. If desired, the remaining rubber bonded to the cords or strands can be removed by wire brushes or the like. This technique is quite tedious and time-consuming, however, and is preferably avoided.

Figure 3:
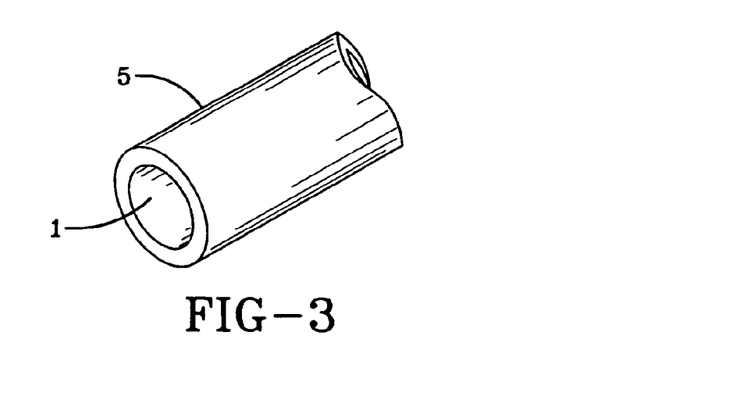
FIG. 3 is a steel cord strand shown sheathed in a coating of the vulcanized belt rubber.

An alternative method of removing the rubber body (14) includes using a means having contoured cutting surfaces that remove the rubber body (14) while leaving the strands (1) coated in a thin sheath of rubber (5) as shown in FIG. 3. In this technique, the strands (1) can be buffed to enhance the adhesion of the cured rubber sheath (5) prior to splicing the joint. Thus, in this embodiment part of the vulcanized rubber in the belt is removed from the strands, and at least part of the vulcanized rubber remains on the strands. The part of the vulcanized rubber remaining on the strands may be a continuous sheath or discontinuous, with some areas of bare strand exposed.

It is important to note that the present invention is ideally suited to be used on belts; wherein the strands are exposed at the end of the belts as a result of a technique of manufacture. In such a case, the step of preparing the ends (11, 12) for splicing can be avoided or modified eliminating the step of removing the cured rubber.

As shown in FIG. 2, the exposed strands or cords (1) are ideally placed in depressions (22A, 22B) in preformed strips (20) of unvulcanized rubber. These depressions (22A, 22B) each represent a portion of a strand receiving groove (22). Ideally, the number of grooves (22) per inch are twice the number of strands per inch at one end of the belt.

The preformed strips of unvulcanized rubber include a vulcanizable rubber composition. One essential component of the vulcanizable rubber composition is a polyoctenamer. Suitable polyoctenamer may include cyclic or linear macromolecules based on cyclooctene, or a mixture of such cyclic and linear macromolecules. Suitable polyoctenamer is commercially available as Vestenamer 8012 or V6213 from Degussa AG High Performance Polymers. Vestenamer is a polyoctenamer produced in a methathesis reaction of cyclooctene. In one embodiment, the octenamer may have a weight averaged molecular weight of about 90,000 to about 110,000; a glass transition temperature of from about −65° C. to about −75° C.; a crystalline content of from about 10 to about 30 percent by weight; a melting point of from about 36° C. to about 54° C.; a thermal decomposition temperature of from about 250° C. to about 275° C.; a cis/trans ratio of double bonds of from about 20:80 to about 40:60; and Mooney viscosity ML 1+4 of less than 10.

The amount of polyoctenamer used in the vulcanizable rubber composition is sufficient to impart a desirable level of adhesion and modulus. In one embodiment, polyoctenamer is added in an amount ranging from about 1 to about 40 percent by weight of the total rubber or elastomer used in the rubber composition, or about 1 to about 40 phr (parts per hundred rubber). For example, 1 to 40 phr polyoctenamer may be used along with 60 to 99 phr of at least one other elastomer, to make up 100 parts of rubber or elastomer. Alternatively, from about 5 phr to about 30 phr polyoctenamer is added to the rubber composition.

Along with the polyoctenamer, at least one additional, other elastomer may be present in the rubber composition. The at least one additional elastomer may be selected from among elastomers conventionally used in various articles of manufacture. Such elastomers include but are not limited to elastomers such as polychloroprene, poly-epichlorohydrin, polyisobutylene, halogenated-polyisobutylene, natural rubber, polyisoprene, polybutadiene, styrene-butadiene, and blends of such elastomers. In one embodiment, the vulcanizable rubber composition includes natural rubber and styrene-butadiene rubber.

In addition to the elastomers in the vulcanizable rubber composition, fillers may be also present. The amount of such fillers may range from 10 to 250 phr. Preferably, the filler is present in an amount ranging from 20 to 100 phr.

The commonly employed siliceous pigments which may be used in the rubber composition include conventional pyrogenic and precipitated siliceous pigments (silica), although precipitated silicas are preferred. The conventional siliceous pigments preferably employed in this invention are precipitated silicas such as, for example, those obtained by the acidification of a soluble silicate, e.g., sodium silicate.

Such conventional silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The conventional silica may also be typically characterized by having a dibutylphthalate (DBP) absorption value in a range of about 100 to about 400, and more usually about 150 to about 300.

The conventional silica might be expected to have an average ultimate particle size, for example, in the range of 0.01 to 0.05 micron as determined by the electron microscope, although the silica particles may be even smaller, or possibly larger, in size.

Various commercially available silicas may be used, such as, only for example herein, and without limitation, silicas commercially available from PPG Industries under the Hi-Sil trademark with designations 210, 243, etc; silicas available from Rhodia, with, for example, designations of Z1165 MP and Z165GR and silicas available from Degussa AG with, for example, designations VN2 and VN3, etc.

Commonly employed carbon blacks can be used as a conventional filler. Representative examples of such carbon blacks include N110, N121, N220, N231, N234, N242, N293, N299, S315, N326, N330, M332, N339, N343, N347, N351, N358, N375, N539, N550, N582, N630, N642, N650, N683, N754, N762, N765, N774, N787, N907, N908, N990 and N991. These carbon blacks have iodine absorptions ranging from 9 to 145 g/kg and DBP No. ranging from 34 to 150 cm³/100 g.

It may be preferred to have the vulcanizable rubber composition for use in the composite material to additionally contain a conventional sulfur containing organosilicon compound. Examples of suitable sulfur containing organosilicon compounds are of the formula:

in which Z is selected from the group consisting of where $R^6$ is an alkyl group of 1 to 4 carbon atoms, cyclohexyl or phenyl; $R^7$ is alkoxy of 1 to 8 carbon atoms, or cycloalkoxy of 5 to 8 carbon atoms; Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxy diethoxy silyl ethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis (trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenyl isopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'-bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'-bis(trimethoxysilyl-buten-2-yl) tetrasulfide, 4,4'-bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide, 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compounds are 3,3'-bis(triethoxysilylpropyl) disulfide and 3,3'-bis (triethoxysilylpropyl) tetrasulfide. Therefore as to formula I, preferably Z is where $R^7$ is an alkoxy of 2 to 4 carbon atoms, with 2 carbon atoms being particularly preferred; alk is a divalent hydrocarbon of 2 to 4 carbon atoms with 3 carbon atoms being particularly preferred; and n is an integer of from 2 to 5 with 2 and 4 being particularly preferred.

The amount of the sulfur containing organosilicon compound of formula I in a rubber composition will vary depending on the level of other additives that are used. Generally speaking, the amount of the compound of formula I will range from 0.5 to 20 phr. Preferably, the amount will range from 1 to 10 phr.

It is readily understood by those having skill in the art that the vulcanizable rubber composition would be compounded by methods generally known in the rubber compounding art, such as mixing the various sulfur-vulcanizable constituent rubbers with various commonly used additive materials such as, for example, sulfur donors, curing aids, such as activators and retarders and processing additives, such as oils, resins including tackifying resins and plasticizers, fillers, pigments, fatty acid, zinc oxide, waxes, antioxidants and antiozonants and peptizing agents. As known to those skilled in the art, depending on the intended use of the vulcanizable and vulcanized material (rubbers), the additives mentioned above are selected and commonly used in conventional amounts. Representative examples of sulfur donors include elemental sulfur (free sulfur), an amine disulfide, polymeric polysulfide and sulfur olefin adducts. Preferably, the sulfur vulcanizing agent is elemental sulfur. The sulfur vulcanizing agent may be used in an amount ranging from 0.5 to 8 phr. Typical amounts of tackifier resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 10 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

Accelerators are used to control the time and/or temperature required for vulcanization and to improve the properties of the vulcanizate. In one embodiment, a single accelerator system may be used, i.e., primary accelerator. The primary accelerator(s) may be used in total amounts ranging from about 0.5 to about 4, preferably about 0.8 to about 1.5, phr. In another embodiment, combinations of a primary and a secondary accelerator might be used with the secondary accelerator being used in smaller amounts, such as from about 0.05 to about 3 phr, in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates.

The mixing of the vulcanizable rubber composition can be accomplished by methods known to those having skill in the rubber mixing art. For example the ingredients are typically mixed in at least two stages, namely at least one nonproductive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber and carbon black are mixed in one or more non-productive mix stages. The terms "non-productive" and "productive" mix stages are well known to those having skill in the rubber mixing art. The carbon black may be added as a separate ingredient or in the form of a masterbatch. The rubber composition containing the carbon black and the sulfur-containing organosilicon compound, if used, may be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be from 1 to 20 minutes.

Each preformed strip (20) of rubber splicing comprising the vulcanizable rubber composition has a base having a width ($W_S$) and a cut to length $L_S$ as shown in FIG. 2. The strips (20) has a top surface (24) intersected by a plurality of grooves portions (22A, 22B) each groove portion being a portion of either a first side (25) or a second side (26) of the strip.

By orienting the strips (20) into an array of bottom strips (20) with the grooved portions 22A and 22B of adjacent strips (20) form grooves (22) adjacent the strands (1), the strands (1) of one end (11) can be placed in every other groove (22) while the strands (1) of the other end (12) fills the grooves (22) remaining to be filled. The resulting strands (1) from end (11) and those from end (12) form an overlapping array of strands (1).

Since the number of strands (1) in the splice joints are approximately double the number of strands in the rest of the conveyor belt (10), it is possible to vary the length of the cords or strands (1) in a number of patterned sequences. The principle concept being that a cord (1) cut short in end (11) would be adjacent one or two long cords (1) in end (12) and vice-versa. The resultant effect is that the cords' ends do not bend around the drive pulley at a simultaneous occurrence giving rise to a peak stress. While these splicing techniques are well known in the art, it is important to note that they are easily adaptable to the present invention.

Once the cords or strands (1) are all placed in the grooves (22) in a proper splicing sequence, an array of top strips (20) is placed over the splice opening covering the strands with an array of uncured rubber strips (20) on both the top and bottom.

Preferably, the top strips (20) may be grooved similar to the bottom strips (20). Most preferably, the top and bottom strips are the same in profile and composition.

Alternatively, the top may simply be a flat sheet of uncured rubber.

Dependent on the amount of opening needed for the splice joint, the strip (20) may be provided in a large spool of continuous length, in such a case, the strips may be trimmed to fit as needed.

Alternatively, the strips can be sized in terms of length to provide the optimal splicing length $L_S$ for strength and durability and no additional trimming or cutting of the strips (20) would be recommended. In this case, the belt manufacture can at least insure the splice length is sufficient.

In terms of strip width ($W_S$), an important feature of the splicing strip is that they are preformed to a base width ($W_S$) that is generally about equal to the cord (1) spacing as measured at cord centers. In belts having a width of five feet or more, it can easily be appreciated that the many strips are easier to handle if nested in a platen or fixture. The splicing operator simply can place as many strips as are needed to cover the strands and then must trim cut the last strip to substantially match the overall belt width. Ideally, this trimming simply requires taking a hot knife or similar cutting element and passing it through a groove portion (22A or 22B) of the strip (20). This procedure is applicable to both the top and the bottom of the splice joint.

Figure 4:
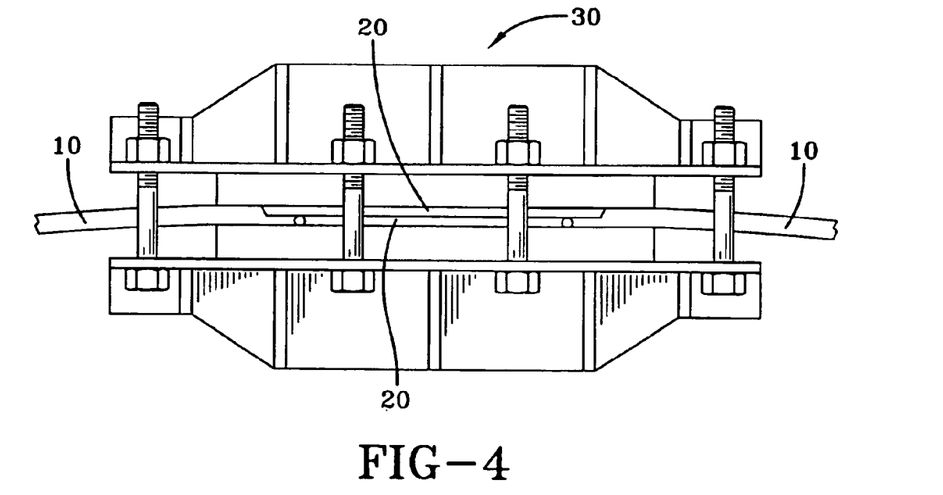
FIG. 4 is a side elevation view of a vulcanizing press for forming a belt joint in accordance to the invention.

Once the uncured strips (20) are positioned and the strands properly placed in the grooves (22), the joint area is placed in a curing press (30) as is shown in FIG. 4. Once cured, the splice is complete. The advantages of precision and quality control improvements can be easily appreciated over the more arcane techniques used in the prior art but, in addition to making a superior splice, this method can reduce splicing time by as much as half over current techniques. When one considers that as many as a hundred splices may be needed in a large mining belt, a reduction from 8 hours to less than 4 hours to complete a single splice joint has obvious cost and time savings.

Figure 5:
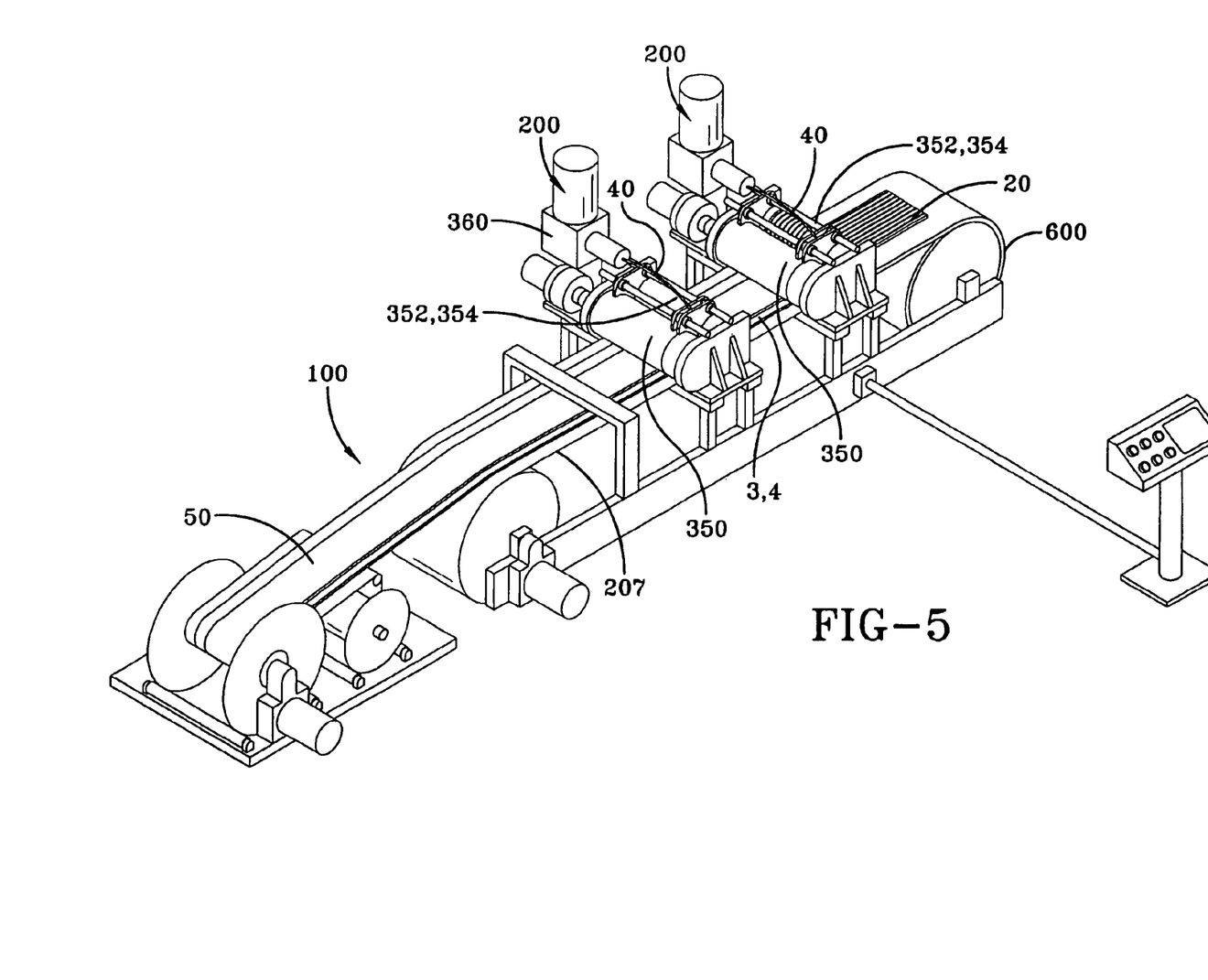
FIG. 5 is a perspective view of a extruder apparatus for forming the preformed elastomeric strip.

In FIG. 5, an extruder (100) is shown for forming the preformed elastomeric strip (20). The extruder (100) has a die head (356) that shapes the strip's profile. A conveyor mechanism (120) can be used to orient and cool the formed strip.

Figure 6:
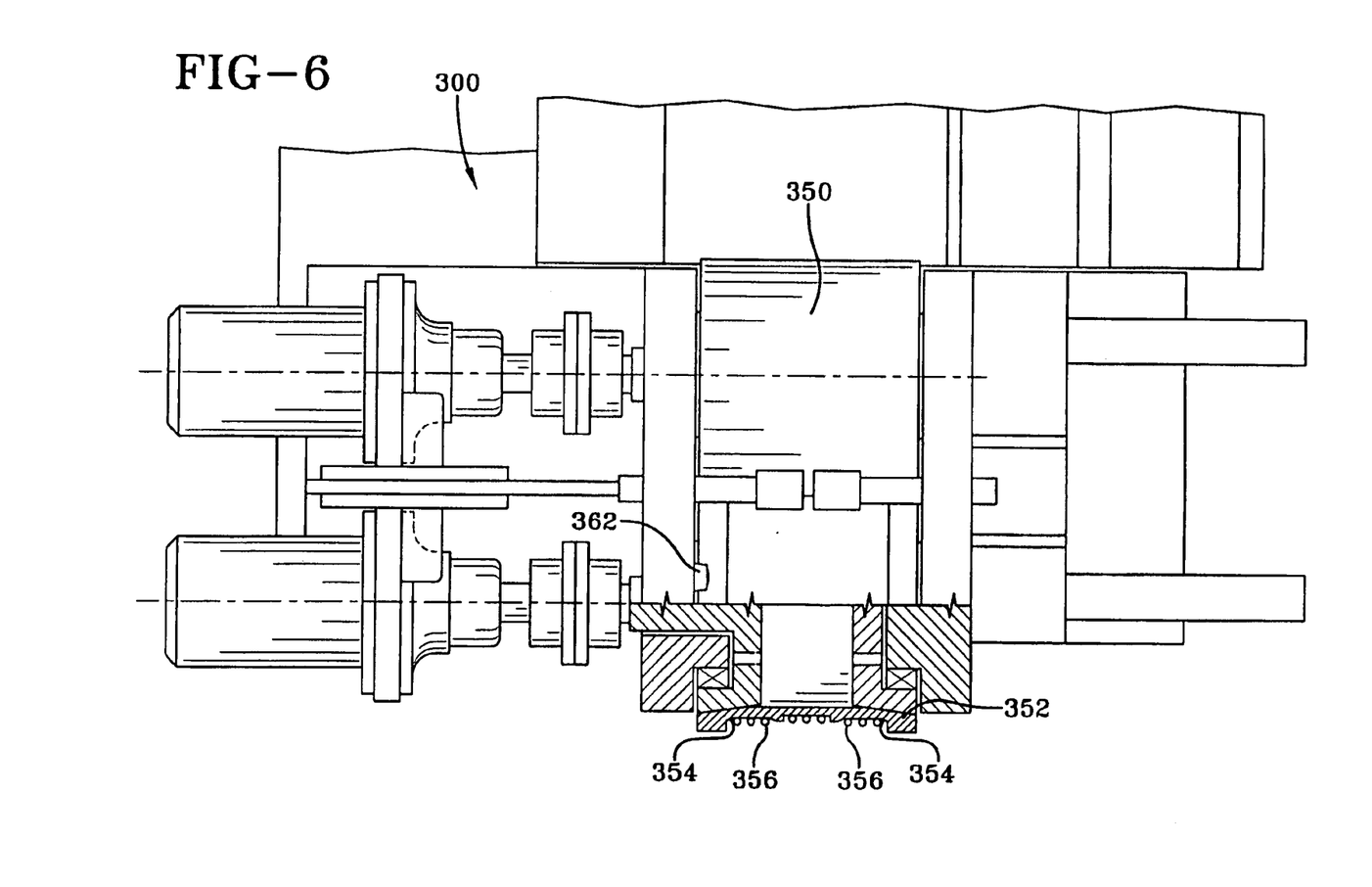
FIG. 6 is a cross-sectional view of the extruder die with a profile for forming the strand receiving grooves in the strip.
Figure 7:
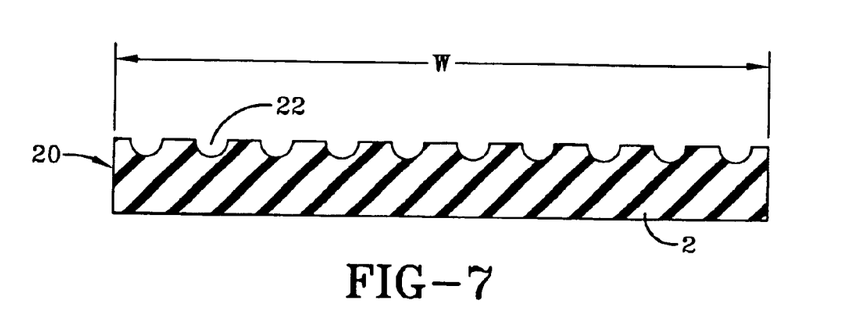
FIG. 7 is a cross-sectional view of a preferred strip (20).

In FIG. 6, the die head is shown profiled to form depressions or groove portions (22A and 22B) in the cross-sectional profile of the strips (20), these groove portions (22A and 22B) form the strand receiving grooves (22). One extruder with preferably only one die head (356) having the groove forming portions (22A and 22B) can establish the overall profile of the strip (20) in a variety of sizes by simply varying he extrusion speed and tension. The strip (20) itself is formed by forming, cooling and delivering the uncured rubber to a spool (40). As the strip profile is formed, the strip (20) is transferred directly onto a conveying means (600) to allow the strip to cool.

Figure 8:
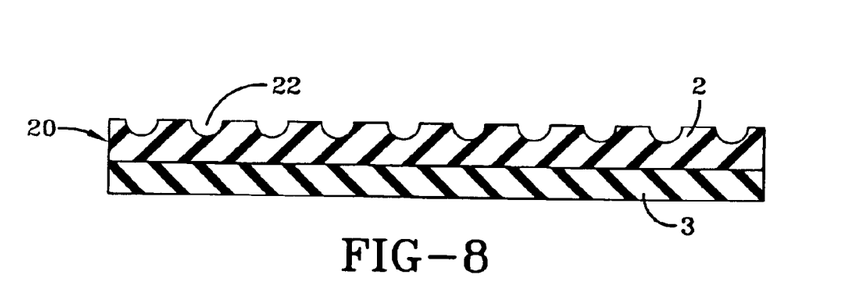
FIG. 8 is a cross-sectional view of a preformed strip with a layer of bottom pulley rubber laminated to the strip.
Figure 9:
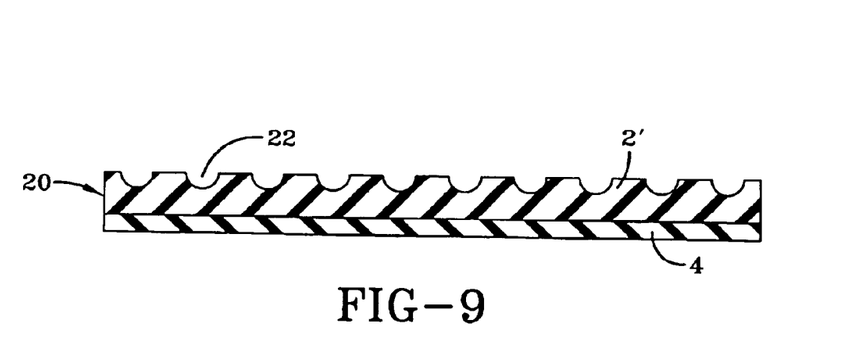
FIG. 9 is a cross-sectional view of a preformed strip with a layer of top cover rubber laminated to it.

Alternatively, the strip (20) can be transferred onto another layer of rubber (3, 4). As shown in FIGS. 8 and 9 respectively, the preformed strips can be laminated onto a layer of bottom pulley rubber (3) or onto a layer of top cover rubber (4), thus, making specific top strips (20) and bottom strips (20). In such a case, a duplex extruder can be used to simultaneously form the two layers as shown in FIG. 5.

It is believed preferable to transfer the strip (20) onto a carrier member such as liner (50). Most preferably a poly liner (50).

Figure 10:
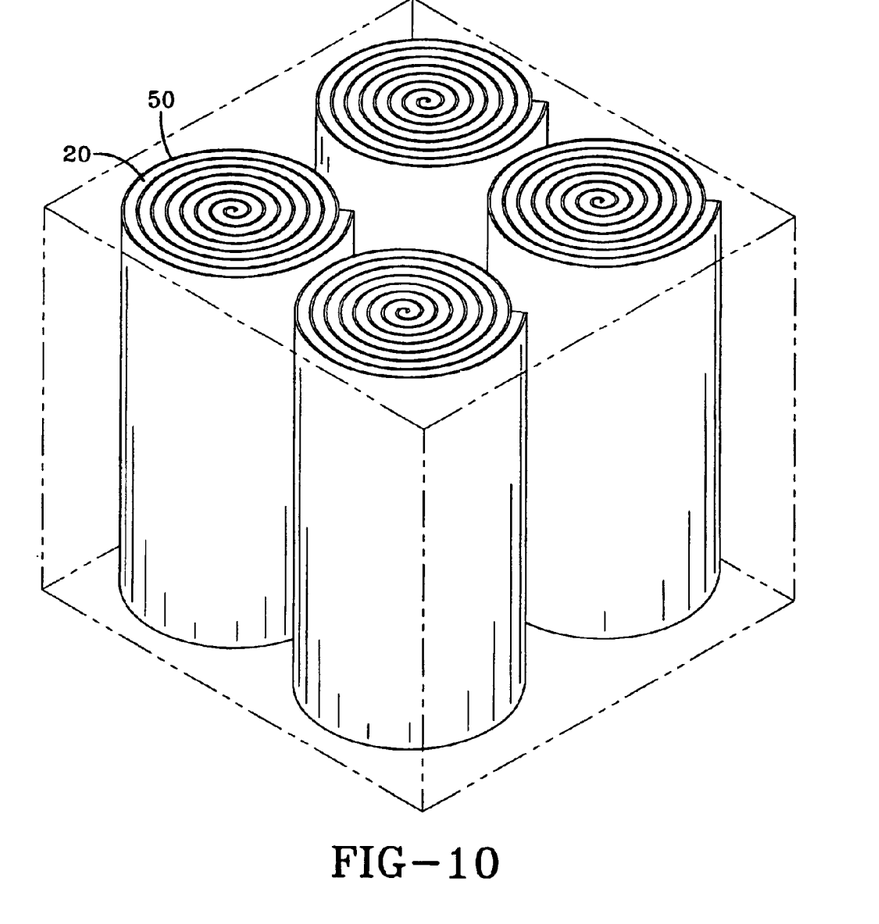
FIG. 10 is a perspective view of the strip on a spool for splicing a joint for a belt reinforced with steel strands embedded in rubber.

As shown in FIG. 10, the strip (20) when placed on a liner (50) can be coiled and spooled. Assuming the strip (20) is attached or transferred onto the liner (50) at the location where it is formed, i.e. at the extruder, then the adhesion to the liner (50) is such that the strip (20) will be securely fixed to the liner (50). This minimized the potential for shipping and handling damage. As shown, the length of strip (20) on a spool should be equal to the amount needed to make a splice joint.

Nevertheless, the principles of forming strips (20) advantageously enables the component to be preformed in a green or uncured state. This insures that the strips (20) can be used without the necessity of using solvents and cements.

The invention is further illustrated by the following non-limiting example.

EXAMPLE I

This example illustrates the effect of adding polyoctenamer to a vulcanizable rubber composition on the physical properties of the compound, and on the adhesion of the composition to steel cord.

Four compound samples were prepared as indicated in Table 1. The samples were compounded with identical and standard amounts of fillers, sulfur, accelerators, antioxidants, and process aids.

TABLE 1

|  | Sample | | |
| --- | --- | --- | --- |
|  | 1 | 2 | 3 |
| SBR | 80 | 70 | 60 |
| Natural Rubber | 20 | 20 | 20 |
| Polyoctenamer | 0 | 10 | 20 |

[1]Vestenamer 8012, from Degussa AG High Performance Polymers

The samples of Table 1 were cured for 35 minutes at 305° F. and tested for physical properties as indicated in Table 2.

TABLE 2

|  | Sample | | |
| --- | --- | --- | --- |
|  | Control 1 | 2 | 3 |
| Hardness | 77 | 80 | 84 |
| Tensile strength (psi) | 2942 | 2730 | 2637 |
| Elongation (%) | 444 | 402 | 368 |
| Modulus 100% (psi) | 507 | 648 | 723 |
| Modulus 300% (psi) | 1848 | 2021 | 2099 |
| Tear die C (lbs./in.) | 253 | 250 | 256 |

Adhesion test blocks were prepared from Samples 1 through 3 using 8 mm galvanized steel cord. The test blocks were prepared and tested for dynamic adhesion following the procedures of Australia Standard AS 1333, Appendices I and K. Dynamic adhesion was evaluated as cycles to failure at a frequency of 10 cycles/80 seconds with maximum and minimum force of 50 and 6 percent of static pullout force, respectively. Dynamic adhesion was evaluated for test blocks made with pre-coated compound to approximate performance as a splice. The cord was first cured with Sample 1 compound, then stripped to leave a thin layer, buffed and then cured to subject stock. Dynamic adhesion results are given in Table 3.

TABLE 3

Dynamic Adhesion

|  | Control 1 | Sample 2 | 3 |
|---|---|---|---|
| Dynamic Adhesion (cycles to failure) | 25618 | 31743 | 110139 |

Significantly, surprisingly and unexpectedly the dynamic adhesion more than quadrupled for Sample 3 containing 20 parts polyoctenamer, as compared to Control Sample 1. Sample 2 also showed significant improvement in dynamic adhesion. Conveyor belt splices utilizing polyoctenamer as in the present invention may exhibit a dynamic adhesion rating in the splice of more than 50,000 cycles; alternatively, more than 75,000 cycles; alternatively, more than 100,000 cycles.

While certain representative embodiments and details have been shown for the purpose of illustrating the invention, it will be apparent to those skilled in this art that various changes and modifications may be made therein without departing from the spirit or scope of the invention.

What is claimed is:

1. A conveyor belt comprising at least one spliced joint, said spliced joint comprising a plurality of steel strands and a rubber composition applied to said steel strands, said rubber composition comprising 100 parts by weight of rubber, said rubber comprising from about 1 to about 40 parts by weight of polyoctenamer.

2. The conveyor belt of claim 1, wherein said rubber composition further comprises at least one additional rubber selected from the group consisting of polychloroprene, poly-epichlorohydrin, polyisobutylene, halogenated-polyisobutylene, natural rubber, polyisoprene, polybutadiene, styrene-butadiene, and blends thereof.

3. The conveyor belt of claim 1, wherein said rubber composition further comprises at least one additional rubber selected from styrene-butadiene rubber and natural rubber.

4. The conveyor belt of claim 1, wherein said rubber composition comprises from about 5 to about 30 parts by weight of polyoctenamer.

5. The conveyor belt of claim 1, wherein said spliced joint has a dynamic adhesion rating of at least 50,000 cycles, based on AS-1333, Appendix K.

6. The conveyor belt of claim 1, wherein said spliced joint has a dynamic adhesion rating of at least 75,000 cycles, based on AS-1333, Appendix K.

7. The conveyor belt of claim 1, wherein said spliced joint has a dynamic adhesion rating of at least 100,000 cycles, based on AS-1333, Appendix K.

8. The conveyor belt of claim 1, wherein said spliced joint has a dynamic adhesion rating of at least 50,000 cycles, based on AS-1333, Appendix K, wherein the dynamic adhesion is measured at a frequency of 10 cycles/80 seconds with a minimum load of 6 percent of the static pullout force and a maximum load of 50 percent of the static pullout force.

9. The conveyor belt of claim 1, wherein said spliced joint has a dynamic adhesion rating of at least 75,000 cycles, based on AS-1333, Appendix K, wherein the dynamic adhesion is measured at a frequency of 10 cycles/80 seconds with a minimum load of 6 percent of the static pullout force and a maximum load of 50 percent of the static pullout force.

10. The conveyor belt of claim 1, wherein said spliced joint has a dynamic adhesion rating of at least 100,000 cycles, based on AS-1333, Appendix K, wherein the dynamic adhesion is measured at a frequency of 10 cycles/80 seconds with a minimum load of 6 percent of the static pullout force and a maximum load of 50 percent of the static pullout force.

11. The conveyor belt of claim 1, wherein said conveyor belt further comprises a rubber body, and said steel strands are at least partially coated with rubber from said rubber body.

* * * * *